United States Patent
Batmaz

(10) Patent No.: US 10,046,287 B2
(45) Date of Patent: Aug. 14, 2018

(54) METHODS FOR MIXING PRODUCTS USING ACOUSTIC MIXING

(71) Applicant: Nestec S.A., Vevey (CH)

(72) Inventor: Ediz Batmaz, Grand Rapids, MI (US)

(73) Assignee: Nestec S. A., Vevey (CH)

( * ) Notice: Subject to any disclaimer, the term of this patent is extended or adjusted under 35 U.S.C. 154(b) by 440 days.

(21) Appl. No.: 13/873,571

(22) Filed: Apr. 30, 2013

(65) Prior Publication Data

US 2013/0295246 A1 Nov. 7, 2013

Related U.S. Application Data

(60) Provisional application No. 61/641,542, filed on May 2, 2012.

(51) Int. Cl.

| B01F 11/00 | (2006.01) |
|---|---|
| B65B 55/02 | (2006.01) |
| A23L 5/30 | (2016.01) |
| A23B 7/005 | (2006.01) |
| A23B 7/01 | (2006.01) |

(Continued)

(52) U.S. Cl.
CPC ........ *B01F 11/0062* (2013.01); *A23B 4/0056* (2013.01); *A23B 4/012* (2013.01); *A23B 7/0056* (2013.01); *A23B 7/012* (2013.01); *A23L 3/005* (2013.01); *A23L 3/022* (2013.01); *A23L 5/32* (2016.08); *B01F 11/0094* (2013.01);

(Continued)

(58) Field of Classification Search
CPC ........ A23L 3/005; A23L 3/022; A23L 1/0128; A23L 1/0252; A23L 3/015–3/0155; A23L 5/32; A23P 1/00; B65B 55/02; B65B 55/14; A23B 4/005–4/012; A23B 5/005–5/01; A23B 7/005–7/012; A23B 9/02–9/04; B01F 11/0266; B01F 11/0094; B01F 11/0062

USPC ................ 426/234, 238, 405, 407–409, 412, 426/520–522, 519, 524; 366/108–128

See application file for complete search history.

(56) References Cited

U.S. PATENT DOCUMENTS 1,491,031 A * 4/1924 Chapman ........................ 99/371
1,709,175 A * 4/1929 Huygen ........................ 99/370

(Continued)

FOREIGN PATENT DOCUMENTS

| CN | 101489423 | 7/2009 |
|---|---|---|
| RU | 2216202 C2 | 11/2003 |
| RU | 2347369 C2 | 2/2009 |

OTHER PUBLICATIONS

XP002713454 dated Oct. 27, 2000, abstract of RU2158097 C1 to Katalizatornaya Stock Co.

(Continued)

*Primary Examiner* — Drew E Becker
(74) *Attorney, Agent, or Firm* — Gary M. Lobel, Esq.

(57) ABSTRACT

The present disclosure provides methods for manufacturing a shelf-stable food product. In a general embodiment, the methods include acoustically mixing the food product with an acoustic mixing device during thermal processing of the food product. The methods of the present disclosure provide several advantages including, but not limited to, rapid achievement of a uniform temperature distribution during thermal processing, retention of nutrient content and organoleptic properties of the food product, and retention of particle integrity in the food product during and after mixing.

17 Claims, 4 Drawing Sheets

(51) Int. Cl.
| | |
|---|---|
| *A23B 4/01* | (2006.01) |
| *A23B 4/005* | (2006.01) |
| *A23L 3/02* | (2006.01) |
| *B65B 55/14* | (2006.01) |
| *B01F 11/02* | (2006.01) |
| *A23L 3/005* | (2006.01) |
| *A23P 10/00* | (2016.01) |

(52) U.S. Cl.
CPC ......... *B01F 11/0266* (2013.01); *B65B 55/02* (2013.01); *B65B 55/14* (2013.01); *A23P 10/00* (2016.08)

(56) References Cited

U.S. PATENT DOCUMENTS

| | | | | |
|---|---|---|---|---|
| 3,427,004 | A | * | 2/1969 | Cover et al. ............ 366/218 |
| 3,767,829 | A | * | 10/1973 | Karr ....................... 426/405 |
| 4,170,421 | A | * | 10/1979 | Balding et al. ........... 366/144 |
| 4,504,498 | A | * | 3/1985 | Kissam .................... 426/238 |
| 5,626,824 | A | * | 5/1997 | Ishikawa et al. .......... 422/307 |
| 5,857,312 | A | * | 1/1999 | Walden .................... 53/437 |
| 6,194,015 | B1 | * | 2/2001 | Garrett .................... 426/392 |
| 7,188,993 | B1 | * | 3/2007 | Howe et al. .............. 366/111 |
| 7,866,878 | B2 | | 1/2011 | Howe et al. |
| 7,966,929 | B2 | | 6/2011 | Walden et al. |
| 8,277,754 | B2 | | 10/2012 | Roumagnac et al. |
| 2004/0005242 | A1 | * | 1/2004 | Koulik et al. ............ 422/22 |
| 2004/0195090 | A1 | * | 10/2004 | Omasa ..................... 204/273 |
| 2008/0008796 | A1 | * | 1/2008 | Cassone ................... 426/237 |
| 2009/0110791 | A1 | * | 4/2009 | Burley et al. ............ 426/407 |
| 2009/0311131 | A1 | * | 12/2009 | Tago et al. .............. 422/1 |
| 2010/0272620 | A1 | * | 10/2010 | Greve ...................... 422/307 |
| 2011/0064611 | A1 | * | 3/2011 | Cioanta et al. .......... 422/39 |

OTHER PUBLICATIONS

International Search Report and Written Opinion from copending PCT Application No. PCT/IB2013/053416 dated Oct. 9, 2013.
Reexamination Decision of the Patent Reexamination Board (CN 201380023023.8); dated Dec. 14, 2017.

* cited by examiner

METHODS FOR MIXING PRODUCTS USING ACOUSTIC MIXING

BACKGROUND

The present disclosure relates generally to mixing of compositions. More specifically, the present disclosure relates to methods for mixing compositions using acoustic mixing to achieve an even temperature profile in a reduced amount of time.

For certain manufacturing processes, for example, and depending on the consistency of the product, it may take an undesirably long amount of time to achieve an even temperature distribution throughout the product. In certain cases, existing technology uses external agitation to reduce such a time delay. With agitation, the product being processed (e.g., heated, cooled, etc.) is mixed and a uniform temperature may be achieved in a relatively shorter period of time when compared to products that remain still throughout the process.

Different methods for agitating containers during sterilization are known in the art. However, the effectiveness of these known methods has been limited, especially with respect to the consistency of the product and possible effects on particles contained within the product. Indeed, the greatest limiting factor with known agitation methods is the consistency of the product when the product has a high viscosity value. With such high viscosity products, experiments have shown little or no improvement on the time delay to achieve a uniform temperature throughout.

Accordingly, it is desirable to provide a method for mixing compositions that rapidly provides an even temperature distribution throughout during product manufacturing processes (e.g., heating, cooling, etc.).

SUMMARY

Methods for making the food product using acoustic mixing are provided. In an embodiment, a method for mixing a food product includes providing a food product, acoustically mixing the food product with an acoustic mixing device while thermally processing the food product.

In an embodiment, the acoustic mixing can provide accelerations in the food product up to about 150 g, or up to about 125 g, or up to about 100 g, or up to about 75 g, or the like.

In an embodiment, the acoustic mixing can provide a rate of change in force direction in the food product of 5 Hz to 1000 Hz. In an embodiment, the acoustic mixing can provide a rate of change in force direction in the food product of at least 20 Hz, or at least 30 Hz, or at least 40 Hz, or at least 50 Hz, or at least 60 Hz, or at least 70 Hz, or at least 80 Hz, or the like.

In an embodiment, the food product comprises particulates and/or has a high viscosity.

In an embodiment, the thermal processing is selected from the group consisting of heating, cooling, or combinations thereof.

In another embodiment, a method for manufacturing a shelf-stable food product is provided. The method includes acoustically mixing the food product with an acoustic mixing device during thermal processing of the food product.

In yet another embodiment, a method for providing a uniform temperature of a food product during heating or cooling of the food product is provided. The method includes acoustically mixing the food product with an acoustic mixing device during thermal processing of the food product.

In still yet another embodiment, a method for decreasing an amount of time required to provide a uniform temperature of a food product during heating or cooling of the food product is provided. The method includes acoustically mixing the food product with an acoustic mixing device during thermal processing of the food product.

In another embodiment, a method for reducing an amount of time to thermally sterilize a food product is provided. The method includes acoustically mixing the food product with an acoustic mixing device during thermal processing of the food product.

In yet another embodiment, a method for reducing an amount of stagnant product on an interior wall of a product vessel is provided. The method includes acoustically mixing the food product with an acoustic mixing device during thermal processing of the food product.

In an embodiment, the acoustic mixing can provide accelerations in the food product up to about 150 g, or up to about 125 g, or up to about 100 g, or up to about 75 g, or the like.

In an embodiment, the acoustic mixing can provide a rate of change in force direction in the food product of 5 Hz to 1000 Hz. In an embodiment, the acoustic mixing can provide a rate of change in force direction in the food product of at least 20 Hz, or at least 30 Hz, or at least 40 Hz, or at least 50 Hz, or at least 60 Hz, or at least 70 Hz, or at least 80 Hz, or the like.

In an embodiment, the food product comprises particulates and/or has a high viscosity.

In an embodiment, the thermal processing is selected from the group consisting of heating, cooling, or combinations thereof.

In yet another embodiment, a method for manufacturing a shelf-stable food product is provided. The method includes providing a thermal processing vessel having a product vessel so constructed and arranged to be sealingly housed by an outer vessel, filling at least a portion of the product vessel with a food product, and simultaneously thermally processing and acoustically mixing the food product in the thermal processing vessel.

In an embodiment, the method further includes filling at least a portion of the outer vessel with a heating or cooling medium.

In an embodiment, the method further includes sealing the product vessel within the outer vessel such that there is no fluid transfer between the product vessel and the outer vessel.

In an embodiment, the acoustic mixing is performed with an acoustic mixing device.

In an embodiment, the acoustic mixing can provide accelerations in the food product up to about 150 g, or up to about 125 g, or up to about 100 g, or up to about 75 g, or the like.

In an embodiment, the acoustic mixing can provide a rate of change in force direction in the food product of 5 Hz to 1000 Hz. In an embodiment, the acoustic mixing can provide a rate of change in force direction in the food product of at least 20 Hz, or at least 30 Hz, or at least 40 Hz, or at least 50 Hz, or at least 60 Hz, or at least 70 Hz, or at least 80 Hz, or the like.

In an embodiment, the food product comprises particulates and/or has a high viscosity.

In an embodiment, the thermal processing is selected from the group consisting of heating, cooling, or combinations thereof.

An advantage of the present disclosure is to provide improved methods for mixing food products.

Another advantage of the present disclosure is to provide food product mixing methods using acoustic mixing.

Yet another advantage of the present disclosure is to provide improved methods for rapidly achieving a uniform temperature of a product.

Still yet another advantage of the present disclosure is to provide methods for sterilizing a food product that improve and/or maintain the overall product quality.

Another advantage of the present disclosure is to provide methods for cooling a food product that improve and/or maintain the overall product quality.

Additional features and advantages are described herein, and will be apparent from the following Detailed Description and the figures.

DETAILED DESCRIPTION

Figure 1:
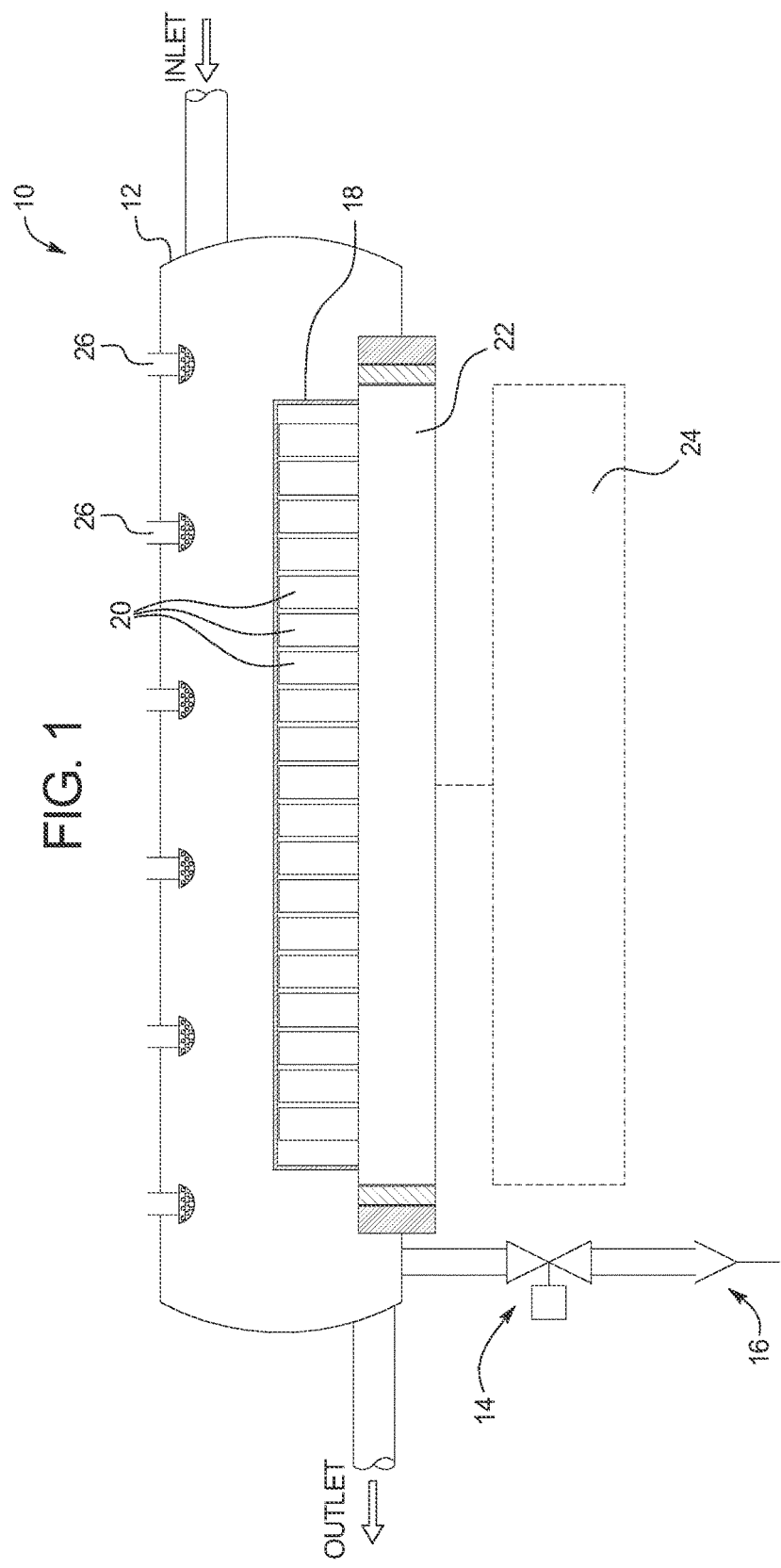
FIG. 1 illustrates a schematic representation of an acoustic mixing integrated heating/cooling assembly in accordance with an embodiment of the present disclosure.

As used herein, the singular forms "a," "an" and "the" include plural referents unless the context clearly dictates otherwise. Thus, for example, reference to "a polypeptide" includes a mixture of two or more polypeptides and the like.

As used herein, "about" is understood to refer to numbers in a range of numerals. Moreover, all numerical ranges herein should be understood to include all integer, whole or fractions, within the range.

As used herein, "product vessel" is understood to include a sterilization vessel, a thermal processing vessel and the like.

In order to produce high-quality, safe, shelf-stable foods, the foods must be sterilized prior to, or after packaging (e.g., ultra-high temperature/aseptic processes, in-container sterilization, etc.). The product should be sterilized properly to make sure that it is safe for consumption, but, at the same time, it should not be over-cooked or over-processed. Indeed, over-sterilization can degrade the organoleptic appeal of the final product.

One manner in which to produce shelf-stable foods is the retort process. Retorts are steam-based processes and there are generally four steam-based processes that are used in sterilizing food, nutraceutical, and pharmaceutical products. Steam can be the direct heating media (e.g., saturated steam) or the indirect heating media (e.g., steam-heated water used in a water immersion process). The different types of retort processes include the following: (i) saturated steam (direct steam heating); (ii) water immersion, both rotary and static (indirect steam heating); (iii) water spray, both rotary and static (indirect steam heating); and (iv) steam-air, both rotary and static (direct steam heating).

Saturated steam processes are the oldest methods of in-container sterilization. Since air is considered an insulating medium, saturating the retort vessel with steam is a requirement of the process. During the process, all air is evacuated from the retort by flooding the vessel with steam and allowing the air to escape through vent valves. Since air is not permitted to enter the vessel at any time during any sterilization step, there can be no overpressure during the sterilization phases of this process.

For retorted food products, and depending on the consistency of the product, there is usually a time delay to get every point in the volume of the product to the same temperature. In certain cases, the existing technology utilizes external agitation to reduce this time delay. With agitation, the product in the container is mixed and a uniform temperature is achieved in a relatively shorter period of time when compared to containers that stand still throughout the sterilization process. For agitation of the food container during sterilization different methods been utilized, but the effectiveness of these methods has been limited. The consistency of the product is the biggest factor in limiting the effectiveness and, for some products with high viscosity values, experiments have shown little or no improvement on the time delay to achieve uniform internal product temperature.

In contrast to the existing, non-invasive agitation technology for sterilization techniques, Applicant has developed methods for thermal processes (e.g., sterilization, pasteurization, etc.) that can be used in several industries including, for example, food, pet food, pharmaceutical, neutraceutical, etc. Accordingly, the methods of the present disclosure solve problems of the prior art by making use of acoustic mixing in food thermal sterilization applications. Acoustic mixing uses low-frequency, high intensity sound energy to provide intimate mixing of different states of matter including, for example, gas/liquid, liquid/liquid, liquid/solid, or solid/solid systems. In other words, acoustic mixing uses uniformly distributed, consistent acoustic energy instead of traditional, mechanical mixing devices. The devices used to provide the acoustic mixing technology may be any devices capable of acoustic mixing and may include, for example, the devices disclosed in U.S. Pat. Nos. 7,188,993 and 7,866,878 to Resodyn Corp. The skilled artisan will appreciate, however, that the devices described in U.S. Pat. Nos. 7,188,993 and 7,866,878 are merely examples of acoustic mixing devices and that any other acoustic mixing device may be used in the present methods.

The present methods include the use of acoustic mixing to mix products during sterilization processes (e.g., retorting processes). In this regard, integration of acoustic mixing technology to thermal processing of sealed (e.g., in-container) foodstuff is used to render the sealed foodstuff shelf-stable. Such acoustic mixing during sterilization processes has surprisingly been found by Applicant to reduce the overall thermal sterilization time of foodstuff and to improve the overall product quality (e.g., nutrient retention, organoleptic properties) of the product that will be exposed to the sterilization process.

It will be appreciated that the present methods need not be limited to use in sterilization processes (e.g., aseptic or retort thermal processing), but could also be used in any application where an even temperature distribution of a composition is required. For example, the methods of the present disclosure could be used in any heating or cooling process including, but not limited to, microwave heating, ohmic heating, conductive heating, conductive cooling, convective heating, convective cooling, radiant heating, radiant cooling, retort, aseptic heating, aseptic cooling, sterilization processes, or combinations thereof. It will also be appreciated that the present methods are not limited to in-container sterilization, and may be used for any of the above-mentioned heating/cooling processes.

As described above, the first and biggest drawback in the existing solutions to achieve an even temperature profile of a product includes significant reduction in effectiveness of the existing agitation methods with increased product consistency. In other words, to induce product mixing in a container, a constant or variable force has to be applied to the container in changing directions so that the headspace in the product constantly changes its relative location in the container and hence product mixing occurs. Existing technologies utilize methods where the force exerted on the product has a very low acceleration value. As the acceleration value gets higher and changes direction faster, the product mixing becomes more efficient. As an example, the highest acceleration exerted on a product container in the most efficient non-invasive agitation method commercially available is in the order of 2-3 g (i.e., gravitational acceleration).

In contrast, with the use of acoustic mixing, as in the present disclosure, gravitational accelerations up to about 75 g, or up to about 100 g, or up to about 125 g, or up to about 150 g can be achieved. Further, a rate of change in force direction 5 Hz to 1000 Hz, or at least 20 Hz, or at least 30 Hz, or at least 40 Hz, or at least 50 Hz, or at least 60 Hz, or at least 70 Hz, or at least 80 Hz, can be accomplished. This flexibility in achieving and controlling high mixing intensities eliminates the limitations experienced with other mixing technologies. With such effective mixing, and since uniform container temperature can be achieved almost instantaneously, the overall thermal process time reduces significantly (e.g., on the order of 90+%). As a result, the organoleptic properties of the processed food can be improved while the loss of nutrients that occurs during thermal processing can be minimized.

Another advantage afforded by use of acoustic mixing is that, with use of the thermal process technologies currently available, product burn-on can occur at the inner walls of the product container. This may occur when the product at the interior walls of the container becomes stagnant and heated and burns to the interior wall of the container. The uniform mixing in the container achieved through the use of acoustic mixing removes the stagnant layer of product at the inner container walls thereby eliminating the possibility of burn-on at the inner container walls.

Further, acoustic mixing coupled with thermal processing has the advantage of mixing uniformly by making use of extremely short (e.g., on the order of 50 micrometers) mixing lengths as opposed to the bulk mixing achieved with existing technologies. Bulk mixing has been found to have detrimental effects on particle integrity for products that include food particles. In many cases, the particles are either sheared to the point where the particle size gets much smaller than the original size introduced prior to sterilization, or the particles are broken up into small and irregular pieces.

FIG. 1 illustrates a schematic manufacturing line 10 that may be used for heating and/or cooling of a food product in accordance with the methods disclosed herein. In an embodiment wherein the manufacturing line is used to heat sterilize a product, the "inlet" may include a steam supply and the "outlet" may include a steam exhaust. In another embodiment, wherein the manufacturing line is used to cool a product, the "inlet" may include a cold water supply and the "outlet" may include a warm water exhaust.

As illustrated in FIG. 1, and in an embodiment, manufacturing line 10 is used to mix a food product while heat sterilizing the product. Accordingly, manufacturing line 10 includes a steam supply at the "inlet" to an outer vessel 12 that traverses the interior of vessel 12 before being outlet at an opposing end of vessel 12. Any condensation that forms within vessel 12 may be expelled by a water drain valve 14 and routed to a drain 16. Although illustrated as a low and wide outer vessel 12, the skilled artisan will appreciate that vessel 12 may be any suitable size and shape so long as vessel 12 is capable of providing a heating/cooling function in combination with acoustic mixing. For example, vessel 12 may also be a substantially cylindrical vessel that is taller and thinner than vessel 12 as illustrated in FIG. 1.

Outer vessel 12 houses an inner vessel 18 that contains a plurality of food containers 20. Food containers 20 sit on top of a payload plate 22 that is part of an acoustic mixing mechanism 24. As discussed above, acoustic mixing mechanism 24 is used to provide rapid agitation (e.g., vibration) of the products contained in food containers 20 to quickly achieve a uniform temperature of same. Additionally, for products that contain particulates and/or have higher viscosities, acoustic mixing mechanism 24 allows the products to be heated to a sufficiently high temperature for prolonged amounts of time to achieve sterilization throughout the product, but prevents the product from "burning" to an interior wall of container 20. Constant acoustic mixing of the products provides for a more uniform temperature distribution throughout the product that is achieved at a much faster rate than known agitation methods.

In an alternative embodiment, manufacturing line 10 may be used for cooling of a food product contained in containers 20. When used for cooling purposes, manufacturing line 10 may include the use of spray balls 26 that provide cold water to containers 20.

By way of example and not limitation, the following examples are illustrative of various embodiments of the present disclosure. The formulations and processes below are provided for exemplification only, and they can be modified by the skilled artisan to the necessary extent, depending on the special features that are desired.

EXAMPLES

Applicants performed experiments using different product formulations to determine the mixing efficiency of methods incorporating acoustic mixing during heat sterilization. The experiments were performed using a heating/cooling vessel having a formed vessel (e.g., a product vessel) with a machined jacket (e.g., outer vessel) around the formed vessel for containing the heating or cooling media. The heating/cooling vessel was substantially cylindrical in shape, and included an o-ring to seal between the outer vessel and the product vessel. The product vessel had a capacity of about eight ounces. Two sheathed thermocouples were connected to the heating vessel, one measuring a temperature of the product near the wall of the product vessel, and one measuring a temperature of the product near the center of the product vessel.

Example 1—Chicken Noodle Product

Figure 2:
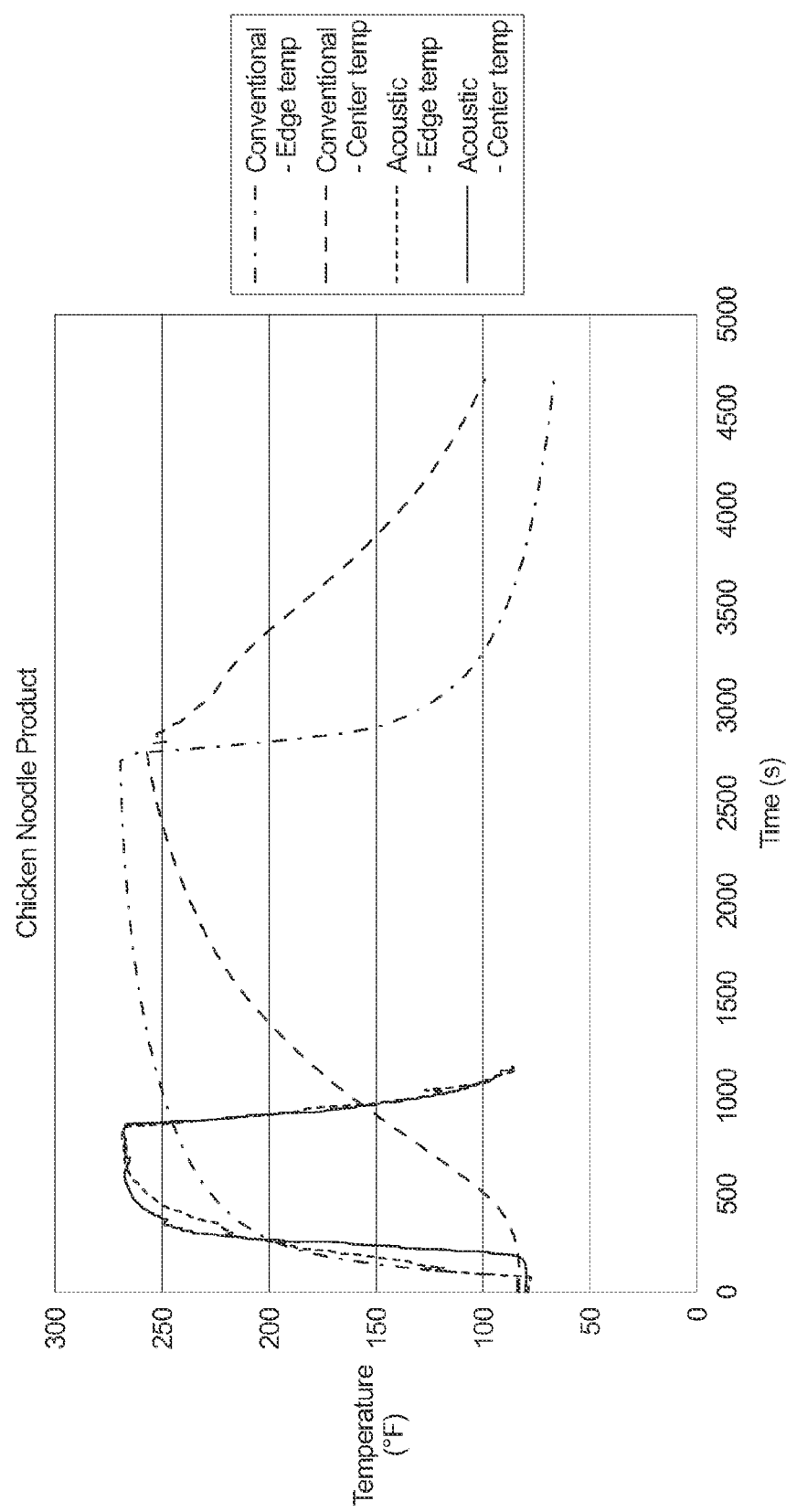
FIG. 2 illustrates the product temperature near the wall and in the center of a chicken noodle product in a product vessel in accordance with an embodiment of the present disclosure.

As shown in FIG. 2, as the chicken noodle product is heated from the jacket side, the wall (i.e., edge) thermocouple comes up to temperature much faster when acoustic mixing is not applied. Further, when acoustic mixing is not applied, it took over 2000 seconds to bring both conventional temperature measurements above 250° F. On the other hand, when acoustic mixing is applied, both temperature measurements rise in temperature almost at the same time. The same effect can be clearly seen during the cooling phase of the chicken noodle product.

Example 2—Barbeque Chicken and Rice Product

Figure 3:
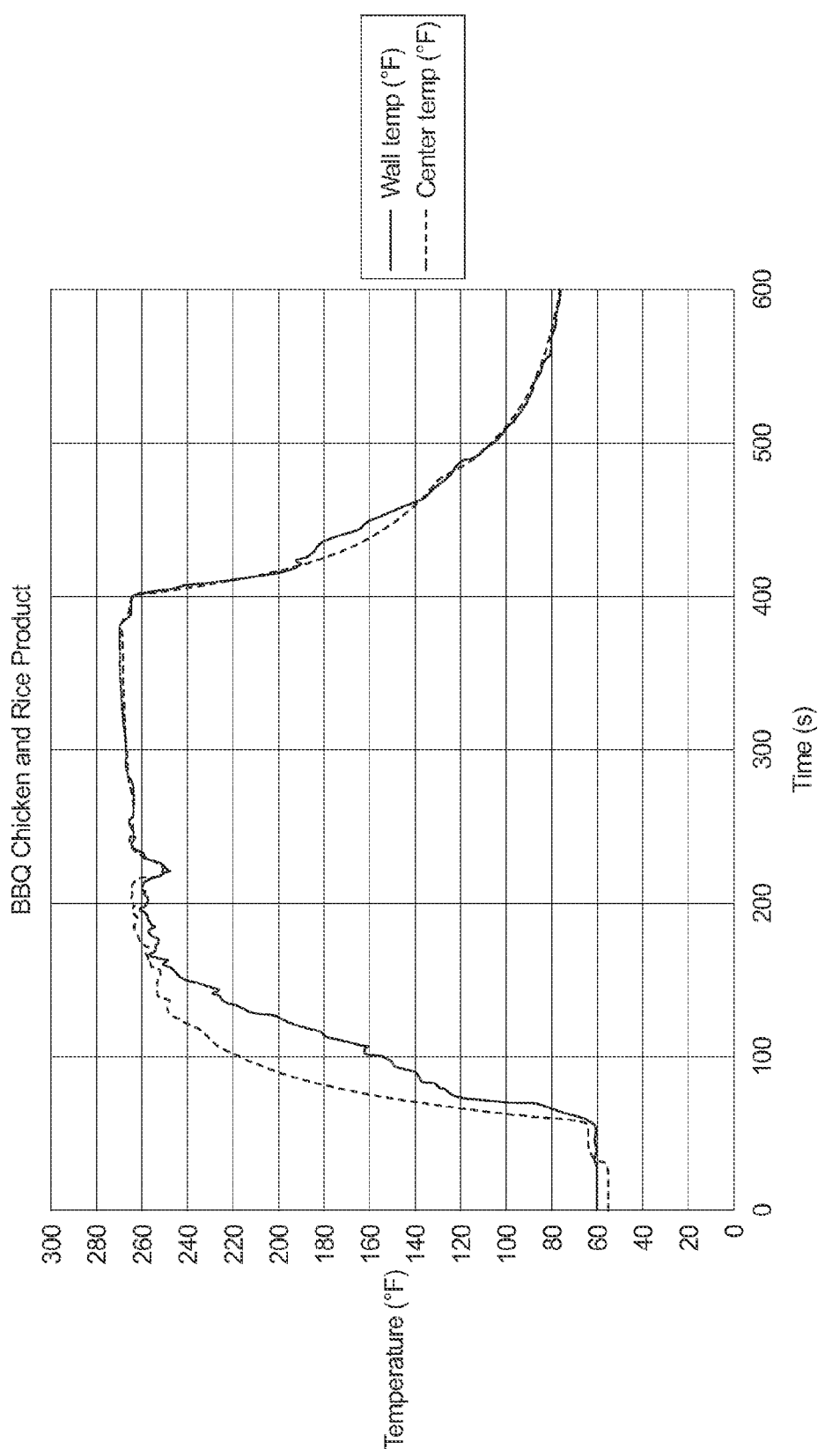
FIG. 3 illustrates the product temperature near the wall and in the center of a barbeque chicken and rice product in a product vessel in accordance with an embodiment of the present disclosure.

As shown in FIG. 3, both the center and wall temperatures for a barbeque chicken and rice product (e.g., the whole volume of the product) can be heated and cooled uniformly. Therefore, any issues concerning cold spots in the container are alleviated by the use of acoustic mixing of the barbeque chicken and rice product during sterilization.

Example 3—Pasta and Beef Product

Figure 4:
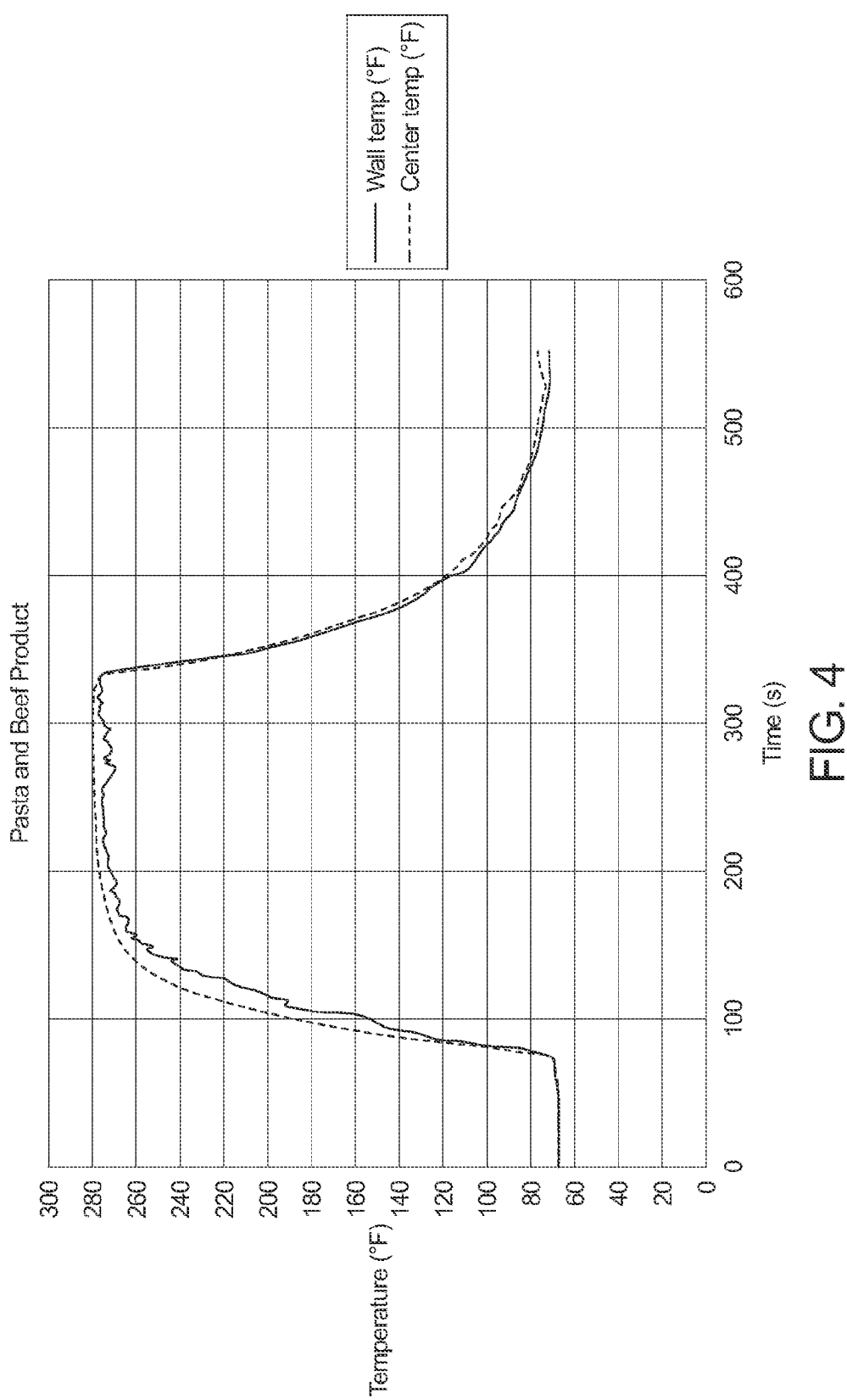
FIG. 4 illustrates the product temperature near the wall and in the center of a pasta and beef product in a product vessel in accordance with an embodiment of the present disclosure.

As shown in FIG. 4, both the center and wall temperatures for a pasta and beef product (e.g., the whole volume of the product) can be heated and cooled uniformly. Therefore, any issues concerning cold spots in the container are alleviated by the use of acoustic mixing of the pasta and beef product during sterilization.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for mixing a food product while thermally processing said food product in a sealed container, the method comprising:
   providing said food product in the sealed container;
   acoustically mixing the food product with an acoustic mixing device while thermally processing said food product which imparts constant accelerations in the food product between 3 g and 150 g with a rate of change in force direction within a range between 5 Hz to 1000 Hz.

2. The method according to claim 1, wherein the acoustic mixing provides a rate of change in force direction in the food product within a range between 20 Hz and 1000 Hz.

3. The method according to claim 1, wherein the food product comprises particulates.

4. The method according to claim 1, wherein the food product is substantially homogenous.

5. The method according to claim 1, wherein the food product comprises a high viscosity.

6. The method according to claim 1, wherein the thermal processing is selected from the group consisting of heating, cooling, and combinations thereof.

7. A method for manufacturing a shelf-stable food product, the method comprising: providing a thermal processing vessel comprising a product vessel so constructed and arranged to be sealingly housed by an outer vessel; filling at least a portion of the product vessel with a plurality of sealed containers which contain said food product; and simultaneously thermally processing and acoustically mixing the food product with an acoustic mixing device which provides constant accelerations in the food product between 3 g and 150 g with a rate of change in force direction within a range between 5 Hz to 1000 Hz.

8. The method according to claim 7, further comprising filling at least a portion of the outer vessel with a heating or cooling medium.

9. The method according to claim 8, further comprising sealing the product vessel within the outer vessel such that there is no fluid transfer between the product vessel and the outer vessel.

10. The method according to claim 7, wherein the food product comprises particulates.

11. The method according to claim 7, wherein the food product is substantially homogenous.

12. The method according to claim 7, wherein the food product comprises a high viscosity.

13. The method according to claim 7, wherein the amount of time required to provide a substantially uniform temperature within the food product during heating or cooling is less than the amount of time required to provide a substantially uniform temperature within the food product when acoustic mixing is not used.

14. The method according to claim 7, wherein the food product is thermally sterilized.

15. The method according to claim 7, wherein the food product is thermally pasteurized.

16. The method according to claim 14, wherein the amount of time required to thermally sterilize the food product is less than the amount of time required to thermally sterilize the food product when acoustic mixing is not used.

17. The method according to claim 15, wherein the amount of time required to thermally pasteurize the food product is less than the amount of time required to thermally pasteurize the food product when acoustic mixing is not used.

* * * * *